United States Patent
Ji et al.

(10) Patent No.: US 8,638,391 B2
(45) Date of Patent: Jan. 28, 2014

(54) IMAGE SENSOR ASSEMBLY FOR REMOVING DUST FROM A SURFACE OF AN IMAGE SENSOR

(75) Inventors: Eun-ho Ji, Seoul (KR); Chi-hun Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 13/150,463

(22) Filed: Jun. 1, 2011

(65) Prior Publication Data

US 2012/0050609 A1 Mar. 1, 2012

(30) Foreign Application Priority Data

Aug. 27, 2010 (KR) .................. 10-2010-0083705

(51) Int. Cl.
*H04N 5/225* (2006.01)
(52) U.S. Cl.
USPC ........................................... 348/374
(58) Field of Classification Search
USPC ................ 348/373, 374, 375, 376, 207.99
See application file for complete search history.

(56) References Cited

U.S. PATENT DOCUMENTS

| | | | | |
|---|---|---|---|---|
| 7,483,075 B2* | 1/2009 | Kobayashi | | 348/374 |
| 7,492,408 B2* | 2/2009 | Ito | | 348/335 |
| 7,719,612 B2* | 5/2010 | Kaihara et al. | | 348/374 |
| 7,978,220 B2* | 7/2011 | Urakami et al. | | 348/207.99 |
| 8,085,336 B2* | 12/2011 | Urakami et al. | | 348/340 |
| 8,199,200 B2* | 6/2012 | Kawai et al. | | 348/205 |
| 2003/0214588 A1* | 11/2003 | Takizawa et al. | | 348/207.99 |
| 2004/0047625 A1* | 3/2004 | Ito et al. | | 396/429 |
| 2004/0169761 A1* | 9/2004 | Kawai et al. | | 348/335 |
| 2005/0024529 A1* | 2/2005 | Kurosawa | | 348/375 |
| 2007/0223966 A1 | 9/2007 | Fujimoto | | |
| 2008/0297646 A1* | 12/2008 | Urakami et al. | | 348/340 |
| 2009/0323187 A1* | 12/2009 | Katsuda | | 359/508 |
| 2012/0008043 A1* | 1/2012 | Yasuda et al. | | 348/374 |

* cited by examiner

*Primary Examiner* — Nicholas Giles
(74) *Attorney, Agent, or Firm* — Drinker Biddle & Reath LLP

(57) ABSTRACT

An image sensor assembly includes: an image sensor; a support plate disposed on a back surface of the image sensor; a first frame which includes a first hole which is open allowing incident light onto the image sensor and is disposed on a front surface of the support plate to enclose at least a side edge of the image sensor; an optical filter disposed in the first hole to block a part of the incident light; a second frame which includes a second hole which is open to allow light to be incident onto the optical filter and is disposed in front of the first frame; a front plate which is disposed in front of the second hole to contact a front surface of at least a side edge of the second frame; and a vibrator which is combined with at least a side edge of the front plate.

12 Claims, 5 Drawing Sheets

IMAGE SENSOR ASSEMBLY FOR REMOVING DUST FROM A SURFACE OF AN IMAGE SENSOR

CROSS-REFERENCE TO RELATED PATENT APPLICATION

This application claims the benefit of Korean Patent Application No. 10-2010-0083705, filed on Aug. 27, 2010, in the Korean Intellectual Property Office, the disclosure of which is incorporated herein in its entirety by reference.

BACKGROUND

The invention relates to an image sensor assembly, and more particularly, to an image sensor assembly capable of effectively removing dust or the like sticking onto a surface of an image sensor.

An image sensor, such as a charge-coupled device (CCD) sensor, a complementary metal-oxide-semiconductor (CMOS) sensor, or the like, is installed in a digital image photographing apparatus, such as a digital camera, a digital camcorder, or the like. The image sensor is for capturing an image. Such an image sensor corresponds to a film of a conventional analog camera, and dust or the like sticking onto a surface of the image sensor may badly affect a quality of a captured image.

SUMMARY

Various embodiments of the invention provide an image sensor assembly capable of effectively removing dust sticking onto a surface of an image sensor; provide an image sensor assembly which can be manufactured to have a simple, small, and light structure and a dust removal function; provide an image sensor assembly which can be easily disassembled and assembled and have a dust removal function; and provide an image sensor assembly which can vibrate a vibrator to effectively remove dust and stably maintain combination states of components even when the vibrator repeatedly vibrates.

According to an embodiment of the invention, there is provided an image sensor assembly including: an image sensor; a support plate which is disposed on a back surface of the image sensor; a first frame which includes a first hole which is open to allow light to be incident onto the image sensor and is disposed on a front surface of the support plate to enclose at least a side edge of the image sensor; an optical filter which is disposed in the first hole to block a part of the incident light; a second frame which includes a second hole which is open to allow light to be incident onto the optical filter and is disposed in front of the first frame; a front plate which is disposed in front of the second hole to contact a front surface of at least a side edge of the second frame; and a vibrator which is combined with at least a side edge of the front plate and vibrates according to an electric signal which is applied from the outside.

The image sensor assembly may further include combination plates, each of which includes an end contacting at least a part of a front surface of the front plate and the other end combined with the support plate to pressurize the front plate, the second frame, and the first frame against the support plate.

The image sensor assembly may further include combination plates which include pressurization plates which contact at least a part of a front edge of the front plate and connection plates which are connected to the pressurization plates and are bent toward the first frame to be combined with the support plate.

The connection plates may include combination holes through which combiners pass, wherein the combiners are combined with the support plate through the combination holes so that the connection plates are combined with the support plate.

The first frame may include extension parts which extend toward positions at which the combiners are combined with the support plate and have holes through which the combiners pass, wherein the combiners are combined with the support plate through the combination holes of the connection plates and the holes of the extension parts.

The image sensor assembly may further include a shock absorbent plate which is disposed between the image sensor and the first frame so that a back surface thereof contacts a front surface of the image sensor and a front surface thereof contacts the first frame.

The vibrator may be a piezoelectric device.

The second frame may include protrusion parts which protrude from a front surface thereof toward the front plate.

The protrusion parts may extend along edges of the second frame.

The front plate may include four edges, wherein at least two combination plates are disposed to contact at least two of the four edges of the front plate.

The front plate may include four edges, wherein at least three combination plates are disposed to contact at least three of the four edges of the front plate.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Structure and operation of an image sensor assembly according to various embodiments of the invention will now be described in detail with reference to the attached drawings.

Figure 1:
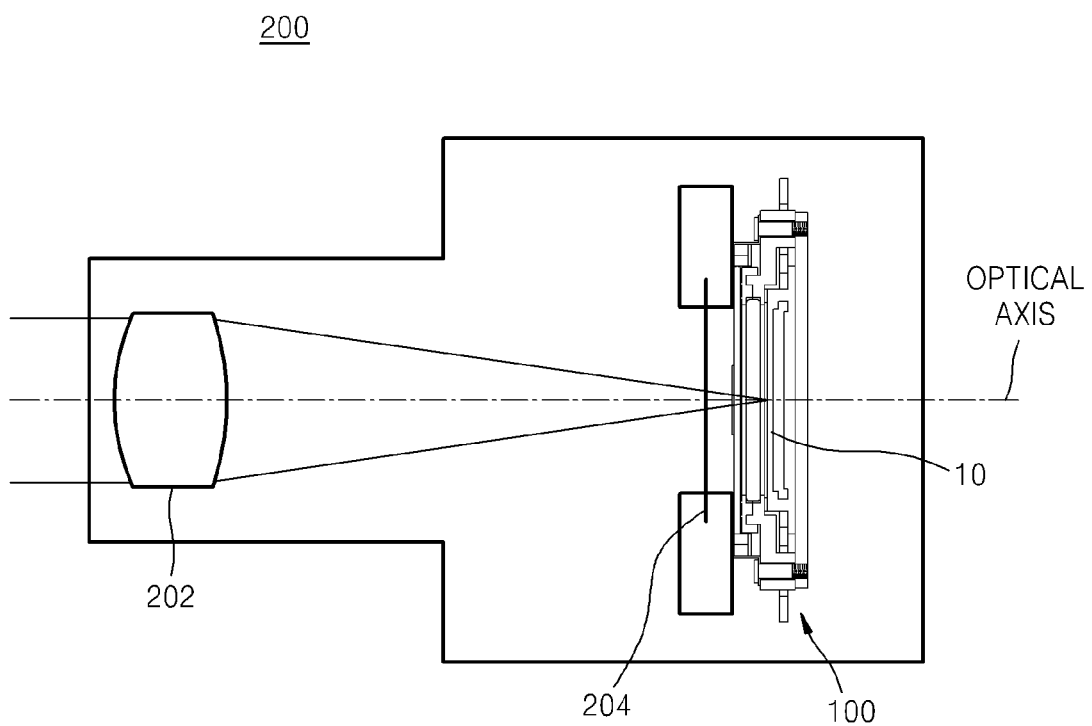
FIG. 1 is a schematic side sectional view of a digital photographing apparatus including an image sensor assembly, according to an embodiment of the invention.

FIG. 1 is a schematic view horizontally illustrating a digital photographing apparatus 200 including an image sensor assembly 100, according to an embodiment of the invention.

Referring to FIG. 1, the image sensor assembly 100 included in the digital photographing apparatus 200 includes an image sensor. The digital photographing apparatus 200 includes a lens unit 202 and the image sensor assembly 100 which is disposed opposite to a subject focused on the lens unit 202.

The image sensor 10 of the image sensor assembly 100 captures an image of the subject and converts the image into an electric signal. The image sensor 10 may be a photoelectric conversion element, such as a charge-coupled device (CCD) or a complementary metal-oxide-semiconductor (CMOS). The image of the subject is formed on an imaging surface of the image sensor 10 through the lens unit 202.

A shutter 204 is installed between the lens unit 202 and the image sensor assembly 100 to control a light exposure of the image sensor 10.

Figure 2:
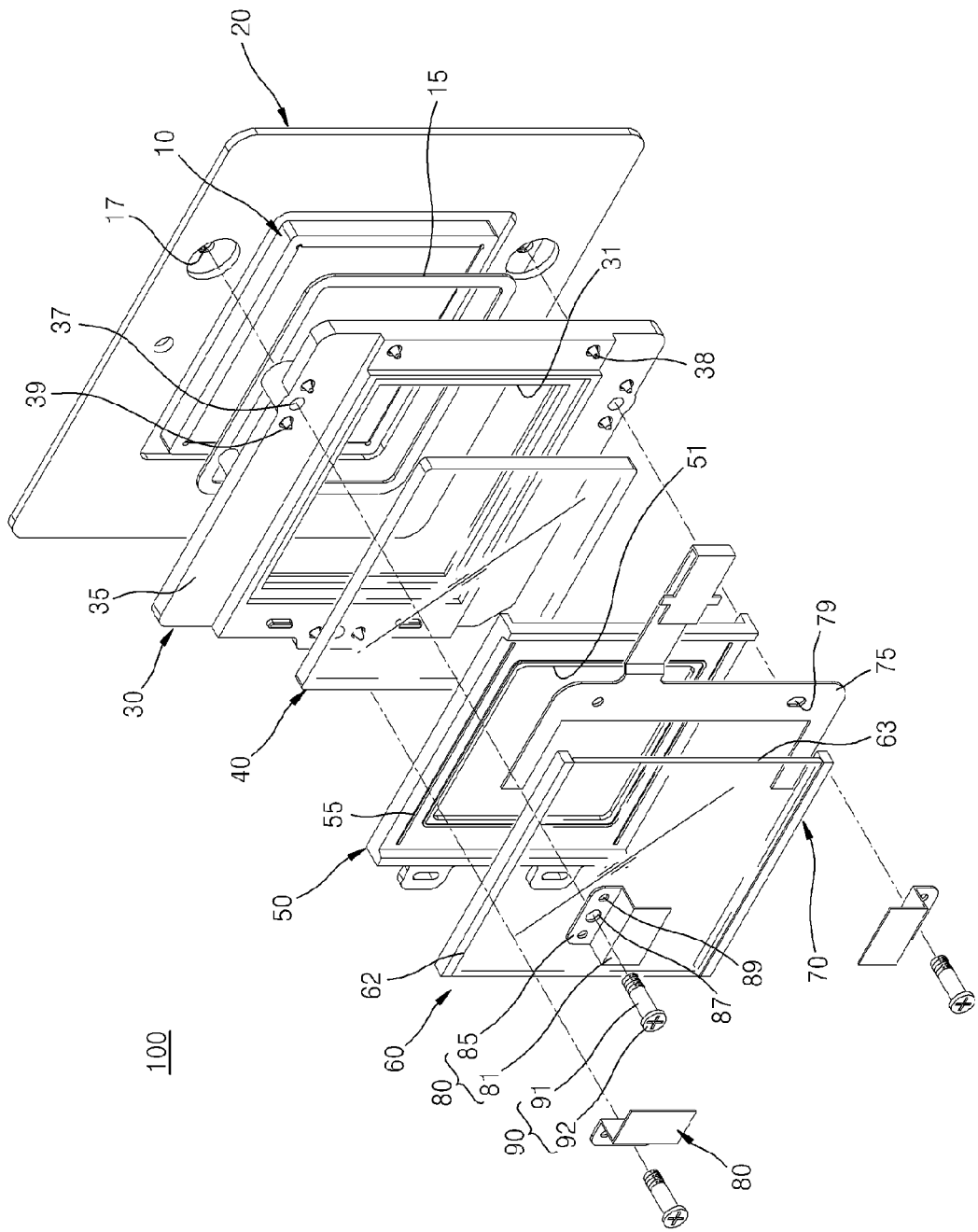
FIG. 2 is an exploded perspective view illustrating combination relations among components of the image sensor assembly of the digital photographing apparatus of FIG. 1.
Figure 3:
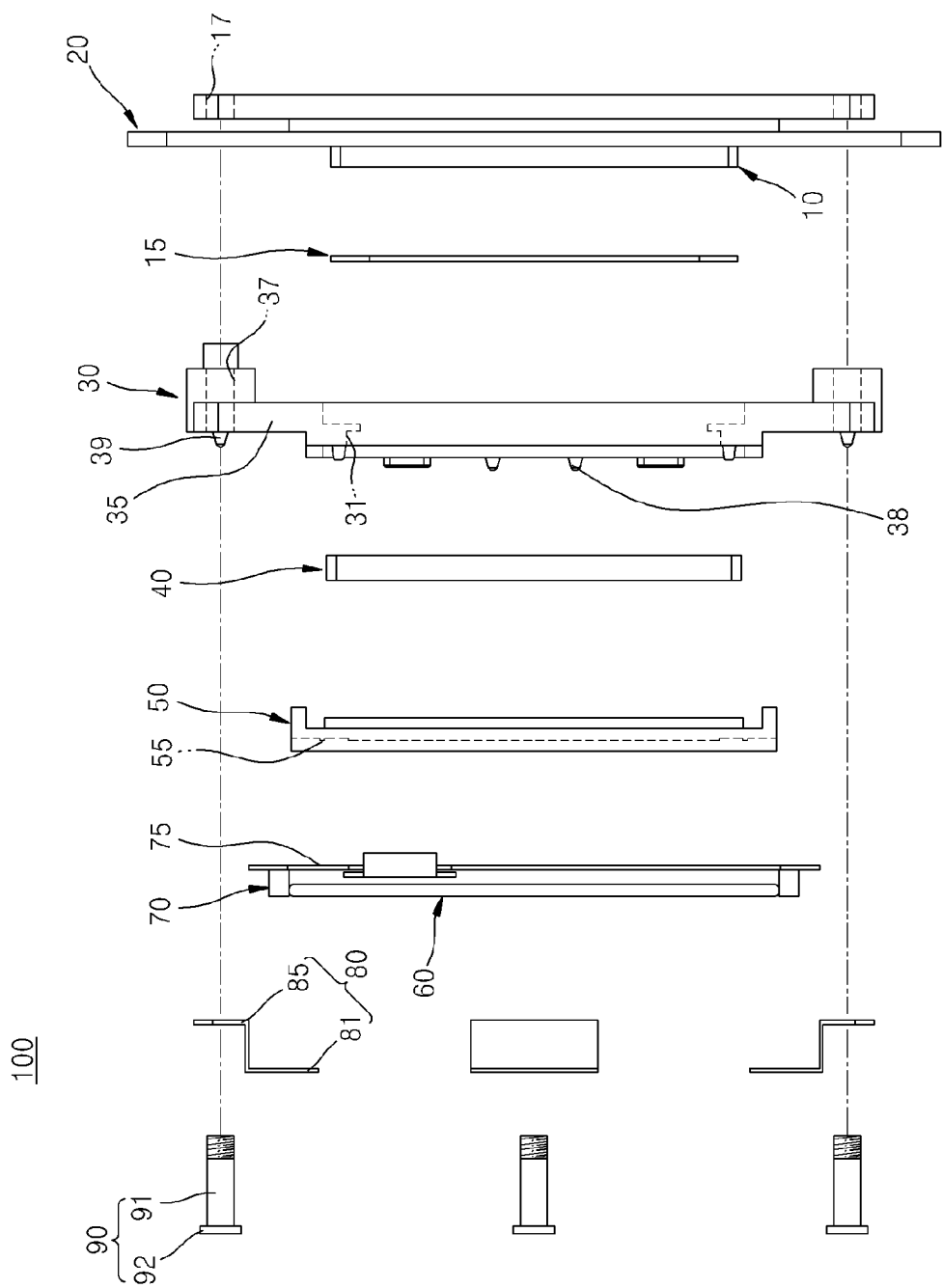
FIG. 3 is a side view illustrating the components of the image sensor assembly of FIG. 1.

FIG. 2 is an exploded perspective view illustrating combination relationships among components of the image sensor assembly 100 of the digital photographing apparatus 200 of FIG. 1. FIG. 3 is a side view illustrating the components of the image sensor assembly 100 of FIG. 1.

The image sensor assembly 100 shown in FIGS. 2 and 3 includes the image sensor 10, a support plate 20, a first frame 30, an optical filter 40, a second frame 50, a front plate 60, and a vibrator 70. The support plate 20 supports the image sensor 10, and the first frame 30 includes a first hole 31 and is disposed on a front surface of the support plate 20 to enclose at least a side edge of the image sensor 10. The optical filter 40 is disposed in the first hole 31, and the second frame 50 includes a second hole 51 and is disposed in front of the first frame 30. The front plate 60 is disposed in front of the second frame 50, and the vibrator 70 is combined with an edge of the front plate 60 to vibrate.

The support plate 20 is disposed on a back surface of the image sensor 10 and is installed at a body of the digital photographing apparatus 200 of FIG. 1. The support plate 20 may support components of the image sensor 10, the first frame 30, and the like The first frame 30 includes the first hole 31 which is open to allow light to be incident onto the image sensor 10 and encloses at least the side edge of the image sensor 10. Since the first frame 30 is disposed on the front surface of the support plate 20, a back surface of the first frame 30 may contact the front surface of the support plate 20.

The optical filter 40 is disposed in the first hole 31 of the first frame 30. The optical filter 40 may be an infrared (IR) cut-off filter which blocks infrared rays. The optical filter 40 is not limited to being the IR cut-off filter but may be a low pass filter (LPT) or the like which blocks other light, e.g., infrared rays and unnecessary light incident onto the image sensor 10.

An impact shock absorbent plate 15 may be disposed between the first frame 30 and the image sensor 10. The shock absorbent plate 15 is formed of a material such as rubber or a synthetic resin having elasticity. The shock absorbent plate 15 has a front surface which contacts the first frame 30 and a back surface which contacts the front surface of the image sensor 10. The shock absorbent plate 15 absorbs vibrations or impacts that are transmitted through the first frame 30 to prevent the image sensor 10 from being damaged.

The shock absorbent plate 15 encloses an all side edges of the image sensor 10 to seal the image sensor 10 so as to prevent a contact of the image sensor 10 with external air. The application of the shock absorbent plate 15 contributes to an effective prevention of moisture on a surface of the image sensor 10 or an inflow of foreign substances, such as dust, into the surface of the image sensor 10.

The shock absorbent plate 15 may pre-adhere onto the back surface of the first frame 30 to assemble the shock absorbent plate 15, the first frame 30, and the support plate 20 by simply disposing the first frame 30 on a surface of the support plate 20 when assembling the first frame 30 and the support plate 20.

The second frame 50, which has the second hole 51 corresponding to the first hole 31, is disposed in front of the first frame 30. The first frame 30 seals the image sensor 10 along with the shock absorbent plate 15 and supports a back surface of the optical filter 40. The second frame 50 is disposed in front of the first frame 30 and supports a front surface of the optical filter 40.

The front plate 60 is disposed in front of the second frame 50. The front plate 60 contacts a front surface of at least a side edge of the second frame 50 and covers the second hole 51. The front plate 60 allows light from the outside to be incident into the second hole 51 and prevents foreign substances, such as dust or the like, from flowing into the image sensor assembly 100.

The front plate 60 may be a LPT which blocks harmful light. The front plate 60 is not limited to being the LPT but may be a glass plate, a lens changing a travelling path of light, or the like.

The vibrator 70 is combined with an edge of the front plate 60. The vibrator 70 may be a piezoelectric device. A piezoelectric device, which operates by a piezoelectric effect, has been widely used to move a lens of an optical system. If piezoelectric devices are used, a subminiature driving motor may be manufactured. The piezoelectric device may be a stack type piezoelectric device which is formed by stacking a plurality of electrodes or a single layer piezoelectric device. If an alternating current (AC) is applied to the piezoelectric device, the piezoelectric device generates vibrations according to driving waveforms of the AC.

A flexible printed circuit board (FPCB) 75 is connected to the vibrator 70 to apply a current to the vibrator 70. If the current is applied to the vibrator 70, vibrations of the vibrator 70 are transmitted to the front plate 60, thereby vibrating the front plate 60. Dust, particles of other foreign substances, or the like sticking onto an outer surface of the front plate 60 may be removed by the vibrations of the front plate 60.

Figure 4:
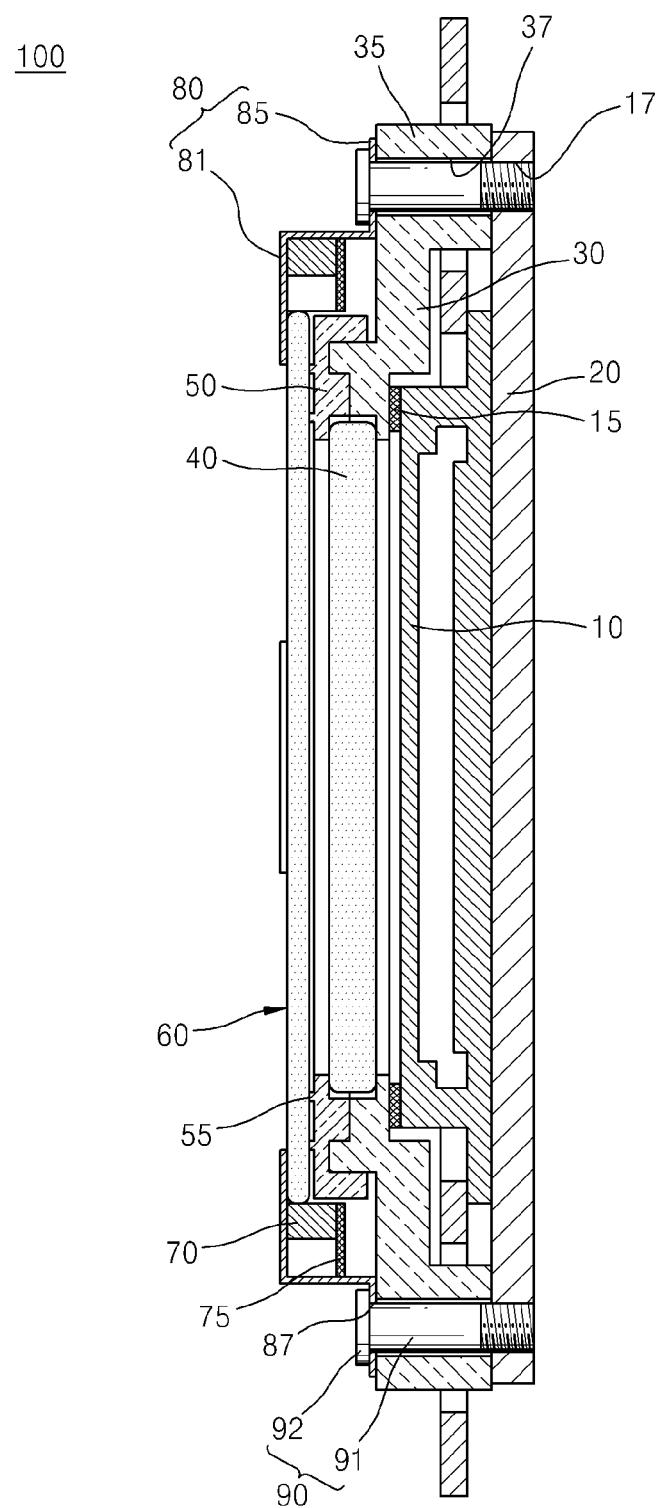
FIG. 4 is a cross-sectional view of the image sensor assembly of FIG. 1, which is completely assembled.

FIG. 4 is a cross-sectional view illustrating the image sensor assembly 100 of FIG. 1, which has been assembled.

Protrusion parts 55 may be formed on the front surface of the second frame 50 so as to protrude toward the front plate 60. The protrusion parts 55 extend along edges of the second frame 50 to contact the front plate 60. The second frame 50 and the protrusion parts 55 may be formed of a material such as rubber or a synthetic resin having elasticity. Thus, the second frame 50 absorbs the vibrations occurring on the front plate 60 to prevent impacts from being transmitted to the image sensor 10 and the support plate 20 due to the vibrations.

If the second frame 50 contacts an entire area of the front surface of the front plate 60, a contact area between the second frame 50 and the front plate 60 increases, thereby interrupting vibrations of the front plate 60 occurring in all directions. However, in the image sensor assembly 100 according to the present embodiment, the protrusion parts 55, which protrude from the front surface of the second frame 50, separate the front plate 60 from the front surface of the second frame 50 to elastically support the front plate 60. Thus, mechanical interference elements interrupting the vibrations of the front plate 60 are minimized. As a result, a dust removal performance of the image sensor assembly 100 may be maximized.

The image sensor assembly 100 further includes combination plates 80, each of which includes an end contacting at least a part of the front plate 60 and the other end combined with the support plate 20 to pressurize the front plate 60, the second frame 50, and the first frame 30 against the support plate 20.

The combination plates 80 include pressurization plates 81 and connection plates 85. The pressurization plates 81 contact at least side edges of the front surface of the front plate 60. The connection plates 85 are connected to outer edges of the pressurization plates 81 and are bent toward the first frame 30 to be combined with the support plate 20.

The connection plates 85 include combination holes 87 through which combiners 90 pass. Bolts may be used as the combiners 90 in the present embodiment. For example, other types of mechanical elements, such as rivets, clips having elasticity, or the like, may be used as the combiners 90. The combiners 90 include head parts 92 and screw parts 91 and pass through the combination holes 87 of the connection plates 85 to be screwed into screw holes 17 that are formed in the support plate 20.

The first frame 30 includes extension parts 35 which extend up to positions at which the combiners 90 are combined with the support plate 20, i.e., up to positions opposite to the screw holes 17 of the support plate 20. The extension parts 35 include holes 37 through which the combiner 90 passes. Thus, the combiners 90 pass sequentially through the connection plates 85 of the combination plates 80 and the first frame 30 to be combined with the support plate 20.

Support protrusions 39 are formed beside both sides of each of the holes 37 of the first frame 30, and the connection plates 85 include insertion holes 89 into which the support protrusions 39 are inserted. Therefore, when the connection plates 85 are combined with the support plate 20 through the combiners 90, the head parts 92 of the combiners 90 pressurize front surfaces of the connection plates 85 against the first frame 30. Since the support protrusions 39 of the first frame 30 are inserted into the insertion holes 89, the combination plates 80 stably maintain their combination states without rotating even when the front plate 60 vibrates due to the vibrations of the vibrator 70.

When the combination plates 80 are combined with the support plate 20 through the combiners 90, the pressurization plates 81 of the combination plates 80 pressurize the front plate 60 against the support plate 20. Thus, the front plate 60, the second frame 50, the optical filter 40, and the first frame 30 adhere to the support plate 20.

The support protrusions 39 of the first frame 30 are inserted into insertion holes 79 of the FPCB 75 so as to stably maintain a combination state of the FPCB 75.

Figure 5:
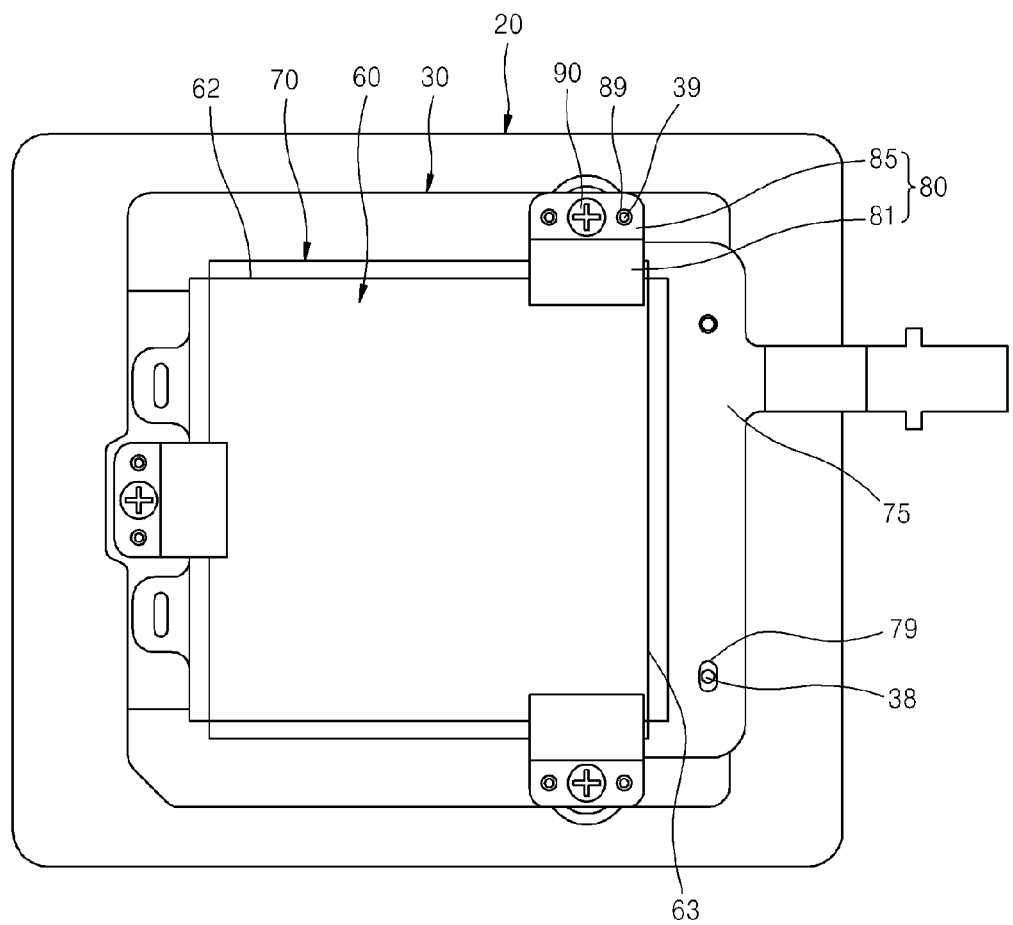
FIG. 5 is a front view of the image sensor assembly of FIG. 4.

FIG. 5 is a front view of the image sensor assembly 100 of FIG. 4.

The front plate 60 is manufactured in an approximately rectangular flat shape and thus includes two horizontal edges 62 and two vertical edges 63. Three combination plates 80 are disposed at three of four edges of the front plate 60 to contact the three edges. In other words, the front plate 60 is supported at three positions by the three combination plates 80, wherein two combination plates 80 are disposed to contact the two horizontal edges 62, and the other combination plate 80 is disposed to contact one of the vertical edges 63.

Since the front plate 60 is supported at the three positions by the combination plates 80 as described above, the assembled state of the image sensor assembly 100 may be stably maintained although the vibrator 70 continuously vibrates to remove dust sticking onto the surface of the front plate 60.

However, the number of combination plates 80 supporting the front plate 60 is not limited thereto. Thus, two combination plates 80 may be installed in contact with two of four edges of the front plate 60 to support the front plate 60 at two positions.

In general, a dust removing apparatus must be installed in an image sensor assembly to remove dust sticking onto a surface of an image sensor. The dust removing apparatus must minimize impacts applied to the image sensor and effectively remove dust. However, the number of parts may be increased to accomplish the two objects, which makes the dust removing apparatus complicated and increases an entire thickness of the image sensor assembly.

The image sensor assembly 100 having the above-described structure according to embodiments of the invention may be assembled using the following method. The first frame 30 having the back surface onto which the shock absorbent plate 15 has adhered is combined with the front surface of the support plate 20 at which the image sensor 10 has been installed. The front plate 60 onto which the optical filter 40, the second frame 50, and the vibrator 70 have adhered is disposed on the front surface of the first frame 30. The combination plates 80 are installed to pressurize the front surface of the front plate 60.

The image sensor assembly 100 may be assembled using a simple method by which a minimum number of components are sequentially stacked and then are combined with one another through the combiners 90 such as bolts, without using a complicated tool. If the combiners 90 are separated from the support plate 20 to disassemble the image sensor assembly 100, all components may be separated from one another.

The combination plates 80 pressurize the front plate 60, the second frame 50, the optical filter 40, and the first frame 30 against the support plate 20. Thus, the front plate 60 and the vibrator 70, which vibrate to remove dust, are stably supported, and combination states of all of the components are stably maintained by the combination plates 80.

Since the first frame 30 and the shock absorbent plate 15 seal the image sensor 10, an inflow of external foreign substances or moisture into the image sensor 10 is effectively prevented.

As described above, an image sensor assembly according to embodiments of the invention is assembled using a simple method by which a minimum number of components are sequentially stacked and then combined with one another through combiners such as bolts. The image sensor assembly may also be disassembled using a simple method.

A complicated tool does not need to be utilized to install a vibrator and a front plate which vibrates by the vibrator. Thus, the image sensor assembly may be manufactured in a simple, compact, and light structure.

Since combination plates pressurize the front plate, a second frame, an optical filter, and a first frame against a support plate, combination states of the components may be stably maintained.

Also, since the first frame and a shock absorbent plate seal the image sensor, the external foreign substances or moisture may be prevented from flowing into the image sensor.

The invention can be embodied as an apparatus which includes a processor, a memory that stores and executes program data, a permanent storage such as a disk drive, a user interface device such as a communication port, a touch panel, a key, a button, or the like which communicates with an external device, and the like. Methods embodied as software modules or algorithms may be stored as computer-readable codes or computer-readable program commands, which may be executed on the processor, on a computer-readable recording medium. Examples of the computer-readable recording medium include magnetic storage media (e.g., ROM, RAM, floppy disks, hard disks, etc.), optical recording media (e.g., CD-ROMs, or DVDs), and the like. The computer-readable recording medium can also be distributed over network coupled computer systems so that the computer-readable code is stored and executed in a distributed fashion. The computer-readable recording medium may be read by a computer, stored in the memory, and executed on the processor.

All documents including cited published literatures, patent applications, patents, etc. may be individually and definitely or in its entirety incorporated into the invention.

While the invention has been particularly shown and described with reference to exemplary embodiments thereof, it will be understood by those of ordinary skill in the art that various changes in form and details may be made therein without departing from the spirit and scope of the invention as defined by the following claims.

The invention may be embodied as functional block structures and various processing steps. The functional block structures may be realized as various types of hardware and/or software structures which execute specific functions. For example, the invention may adopt direct circuit structures such as memories, processing, logics, or look-up tables which control one or more microprocessors or execute various functions through other controlling devices. Like elements of the invention are programmed as software or executed as software elements, the invention may be written in a programming or scripting language such as C, C++, JavaScript, an assembler, or the like, including various types of algorithms which are realized through combinations of data structures, routines, or other programming structures. Functional embodiments may be realized as algorithms which are executed on one or more processors. The invention may also adopt conventional arts to set up electronic environments, process signals, and/or process data. The terms such as "mechanism," "element," "means," and "structure" may be widely used and are not limited to mechanical and physical structures. The terms may include meanings of a series of routines of software in leakage with processors.

Specific executions described in the invention are only examples but are not limited to the scope of the invention even by any method. Control systems, software, and other functional embodiments of the control systems may be omitted for the briefness of the specification. Connections of lines among elements shown in the drawings or connection members are exemplarily referred to as functional connections and/or physical or circuit connections. Therefore, the connections of the lines may be replaced or may be represented as additional various types of functional connections, physical connections, or circuit connections in a real apparatus. If detailed mentions such as "necessarily," "importantly," and the like are used, the detailed mentions may not be necessary elements for applying the invention.

The term "the" and the similar term used in the specification (in particular, claims) of the invention may correspond to both singular and plurality. If "range" is written in the invention, the invention may be regarded as including an individual value belonging to the "range." Therefore, even if a description corresponding to the "range" is not given, the individual value belonging to the "range" may be regarded as being written in the specific description of the invention. If an order of operations of a method according to the invention is clearly written or writing corresponding to the order is not given, the operations may be executed in an appropriate order. However, the invention is not limited to the order of the operations. All examples or exemplary terms (e.g., etc.) used in the invention are for simply describing the invention in detail. As long as the examples or the exemplary terms are not limited to the following claims of the invention, they do not limit the scope of the invention. Also, it will understood by those of ordinary skill in the art that the invention may be embodied according to design conditions and factors within the claims or equivalents including various changes, combinations, and modifications.

What is claimed is:

1. An image sensor assembly comprising:
an image sensor;
a support plate which is disposed on a back surface of the image sensor;
a first frame which comprises a first hole which is open to allow light to be incident onto the image sensor and is disposed on a front surface of the support plate to enclose at least a side edge of the image sensor;
an optical filter which is disposed in the first hole to block a part of the incident light;
a second frame which comprises a second hole which is open to allow light to be incident onto the optical filter, the second frame is disposed in front of the first frame and directly contacts a front surface of the optical filter;
a front plate which is disposed in front of the second hole to contact a front surface of at least a side edge of the second frame; and
a vibrator which is combined with at least a side edge of the front plate and vibrates according to an electric signal which is applied from the outside.

2. The image sensor assembly of claim 1, further comprising:
combination plates, each of which comprises an end contacting at least a part of a front surface of the front plate and the other end combined with the support plate to pressurize the front plate, the second frame, and the first frame against the support plate.

3. The image sensor assembly of claim 1, further comprising:
combination plates which comprise pressurization plates which contact at least a part of a front edge of the front plate and connection plates which are connected to the pressurization plates and are bent toward the first frame to be combined with the support plate.

4. The image sensor assembly of claim 3, wherein:
the connection plates comprise combination holes through which combiners pass; and
the combiners are combined with the support plate through the combination holes so that the connection plates are combined with the support plate.

5. The image sensor assembly of claim 4, wherein:
the first frame comprises extension parts which extend toward positions at which the combiners are combined with the support plate and have holes through which the combiners pass; and
the combiners are combined with the support plate through the combination holes of the connection plates and the holes of the extension parts.

6. The image sensor assembly of claim 1, further comprising:
a shock absorbent plate which is disposed between the image sensor and the first frame so that a back surface thereof contacts a front surface of the image sensor and a front surface thereof contacts the first frame.

7. The image sensor assembly of claim 1, wherein the vibrator is a piezoelectric device.

8. The image sensor assembly of claim 1, wherein the second frame comprises protrusion parts which protrude from a front surface thereof toward the front plate.

9. The image sensor assembly of claim 8, wherein the protrusion parts extend along edges of the second frame.

10. The image sensor assembly of claim 2, wherein:
the front plate comprises four edges; and
at least two combination plates are disposed to contact at least two of the four edges of the front plate.

11. The image sensor assembly of claim 2, wherein:
the front plate comprises four edges; and
at least three combination plates are disposed to contact at least three of the four edges of the front plate.

12. An image sensor assembly comprising:
an image sensor;
a support plate which is disposed on a back surface of the image sensor;
a first frame which comprises a first hole which is open to allow light to be incident onto the image sensor and is disposed on a front surface of the support plate to enclose at least a side edge of the image sensor;
an optical filter which is disposed in the first hole to block a part of the incident light, wherein the first frame directly contacts a back surface of the optical filter;
a second frame which comprises a second hole which is open to allow light to be incident onto the optical filter is disposed in front of the first frame;
a front plate which is disposed in front of the second hole to contact a front surface of at least a side edge of the second frame; and
a vibrator which is combined with at least a side edge of the front plate and vibrates according to an electric signal which is applied from the outside.

* * * * *